3,425,914
SPRAY-TYPE DISTILLATION USING GAS TURBINE
EXHAUST DISTILLAND HEATING
Ziyad R. Kanaan, Ann Arbor, Mich., assignor to General
Motors Corporation, Detroit, Mich., a corporation of
Delaware
Filed Oct. 26, 1966, Ser. No. 589,666
U.S. Cl. 202—177         2 Claims
Int. Cl. B01d 3/06

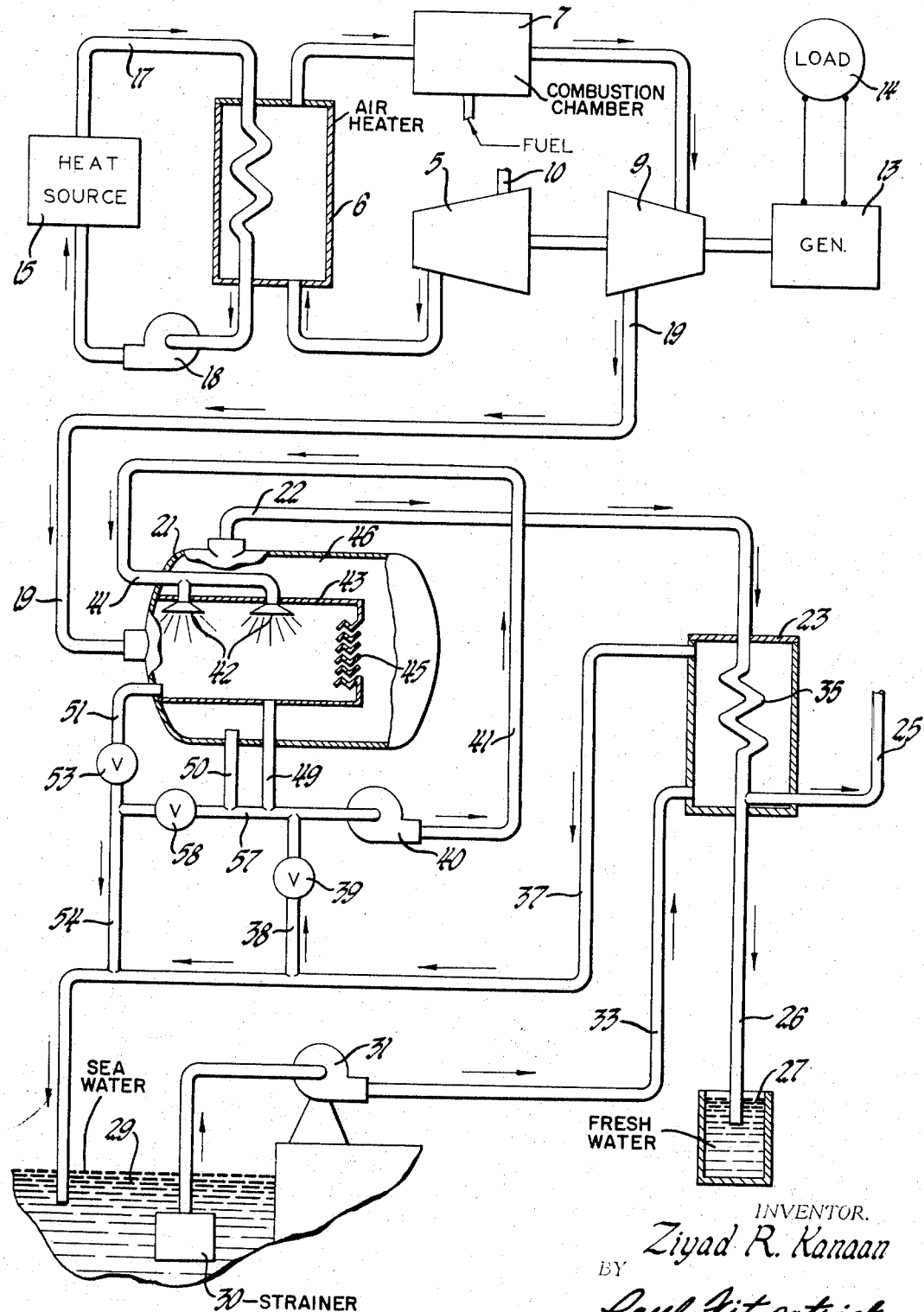

ABSTRACT OF THE DISCLOSURE

A plant for generating useful power and providing fresh water from salt water includes a gas turbine engine which drives a generator, a spray chamber through which the turbine exhaust gas is passed and into which salt water is sprayed, and a condenser cooled by the salt water to condense fresh water from the turbine exhaust.

---

My invention is directed to a power plant having the dual purpose of supplying power, in the form of mechanical or electrical energy for example, and producing fresh water from salt water such as sea water. Such a plant may be highly useful for support of settlements or operation in arid seacoast regions.

It has long been recognized that the exhaust of the usual gas turgine engine contains a great deal of heat energy which may be used for heating purposes as in waste heat boilers, stills, and in general wherever heat energy at moderate temperatures can be utilized. Gas turbine engines have been favored as power generators in remote and arid situations because of their light weight and portability and because they operate without cooling water.

My invention is directed to providing a gas turbine power plant which, with very simple, easily operated, and inexpensive accessory equipment is adapted to produce large quantities of fresh water from sea water by evaporation and condensation, using the engine exhaust gas as the treatment medium for the sea water.

The nature of the invention and its advantages will be clear to those skilled in the art from the succeeding detailed description of the preferred embodiment of my invention and the accompanying schematic drawing thereof.

Referring to the drawing, the gas turbine includes a compressor 5, an indirect air heater 6, a combustion chamber 7, and a turbine 9 connected together for series flow of air from the atmospheric air intake 10 through the compressor, heater, combustion chamber, and turbine, in that order. The turbine is connected to drive the compressor and also to drive mechanically a load device such as an electrical generator 13 which may supply energy to any load 14.

The indirect heater 6 may be any suitable heat exchanger. It may be of the nature of the motive fluid heaters commonly employed in closed circuit gas turbine systems or may be a heat exchanger by which heat is transferred indirectly from an external heat source as illustrated in the figure. In the figure, a heat source 15 gives up heat to a medium circulated through a fluid circuit 17 by a pump 18. The heat source may be a nuclear reactor, a chemical process apparatus releasing heat, a geothermal source, or any other source. The heat exchange fluid flows through the heat exchanger 6 and gives off heat to the air circulating from the compressor 5 to the turbine 9. Additional heat may be contributed to the motive fluid by burning fuel in combustion chamber 7.

Of course, the power plant may be operated with either the indirect heater 6 or the combustion apparatus 7; thus either of these may be omitted if desired. As will be seen, there are advantages to dispensing with direct heating of the air by fuel burned in the air, since the combustion products of the fuel contaminate the fresh water recovered by the plant.

The exhaust from the turbine flows through an exhaust duct or exhaust system including a first duct section 19, a spray chamber device 21, a further duct 22, a condenser 23, and an atmospheric exhaust or outlet 25. Salt water is evaporated to rid it of salt in the spray chamber and the resulting vapor is condensed from the water-saturated exhaust gases in the condenser 23. The resulting fresh water is drained from the condenser through a pipe 26 into a reservoir 27 from which it may be distributed with or without further purification, as may be desired or necessary.

Salt water is supplied to the plant from any suitable body of salt water 29 by means including a water intake or strainer 30 from which water is drawn by a pump 31 which may be driven by a motor (not illustrated) energized by the generator 13. The pump 31 circulates sea water through a line 33 to the body of the condenser for heat exchange with the coils 35. The sea water which is warmed in the condenser returns through a line 37, some of it being returned to the source 29.

Some of the water is diverted from line 37 through a line 38 and valve 39 by a pump 40 which delivers it through a line 41 to spray heads 42 within the spray chamber. Salt water is thus sprayed downwardly into intimate contact with the turbine exhaust which is at about 750 to 850° F., passing horizontally through an inner shell 43 of the spray chamber. A considerable part of the water will thus be evaporated, the gas temperature will be reduced to about 143° F., and the cooled turbine exhaust saturated with water flows through a mechanical separating device 45 into the outer annulus 46 of the spray chamber device from which it flows through line 22 to the condenser. Deflector plates or eliminators 45 are provided to give the air tortuous motion and collect any entrained salty particles such as droplets of salt water or salt grains. Any suitable salt eliminating device other than that illustrated may be put into the circuit between the evaporator and condenser or, depending upon the physical characteristics of the installation and the degree of purity required in the product, the eliminator may be omitted.

The unevaporated salt water in the inner shell 43 of the spray chamber drains through a pipe 49 connected to the pump 39 which recirculates some of it. Also, water which collects in the outer shell of the spray chamber device may drain through a pipe 50 into the pump. Water may also drain directly from the inner shell 43 through an overflow line 51, a valve 53, and a line 54 into the waste line 37 and back to the source. Drain lines 49 and 50 are connected through a waste water line 57 and a valve 58 to the line 54 which returns fluid to the salt water source.

In operation of the system, the exhaust from the gas turbine at about 750 to 850° F. passes through the spray chamber 21 and condenser 23 to the exhaust 25. Salt water sprayed into the exhaust from the spray heads 42 is evaporated to some extent, saturating the air and producing a mixture of air or gas and water vapor at about 143° F. A very considerable part of the water is recovered in the condenser which cools the exhaust to about 90° F. The cooling is effected by salt water circulated through the condenser and, assuming sea water at about 50° F., this may be heated to about 85° in the condenser. Some of the salt water thus preheated is drawn through valve 39 and circulated by pump 40 to the spray heads. The resulting evaporation concentrates the salt water to some extent, and some part of the salt water will be recirculated through line 49 and pump 40, and some of the water will be diverted through valve 58 to allow for make-up salt water. The water vented through line 57 will, of course, be more heavily loaded with salt. In the event that the water level rises more than is desirable, overflow can take place through line 51 and valve 53, which may normally remain closed to prevent waste of air from the system. The pressure in the turbine exhaust and thus in the spray chamber will be about two pounds per square inch gauge so that, apart from gravity effects, there will be sufficient head to discharge the water through the pipes 49, 50, and 51 from the spray chamber. The ratio of make-up water to the discharge of the pump may be controlled by valves 39 and 58 and the speed at which pump 40 is driven may be varied as desired. Any automatic controls, gauges, and other instruments desired may be included in the system, but there is no need to illustrate such details.

It will be apparent from the foregoing description that the components which are added to the basic gas turbine power plant for fresh water recovery are relatively simple and inexpensive, involving primarily the spray chamber, the condenser, a few pumps, and some piping and valves. There is nothing complicated about the operation of the apparatus and no high temperatures or pressures are involved.

Indirect heating of the turbine motive fluid is advantageous as compared to direct heating by fuel combustion in the motive fluid because it eliminates the problem of combustion residues in the condensed water. This may or may not be important, depending upon the kind of fresh water required and the availability of sources of heat. It can be calculated that with a gas turbine power plant delivering approximately 6,000 horsepower, about 58 gallons per minute or 84,000 gallons per day of fresh water can be produced at a cost of about $1.73 per 1,000 gallons.

The detailed description of the preferred embodiment of the invention for the purpose of explaining the principles thereof is not to be considered as limiting or restricting the invention, since many modifications may be made by the exercise of skill in the art.

I claim:

1. A plant for generating useful energy and recovering fresh water from salt water comprising, in combination, a gas turbine engine including a compressor, a means for supplying heat and a turbine; means for driving an external load device from the engine; an exhaust duct leading from the engine conveying exhaust gas from the turbine; a spray chamber supplied by exhaust duct, the spray chamber including an outer shell and an inner shell within and exhausting into the inner shell, the inner shell defining a horizontal flow path for the exhaust gas from the exhaust duct into the outer shell; particle-separating means disposed in the outlet from the inner shell to the outer shell; means in the inner shell for spraying salt water into contact with the exhaust gas for evaporating the water and mixing the resulting vapor with the exhaust gas; a condenser downstream from the separating means supplied with vapor-laden exhaust gas from the outer shell to condense and separate fresh water from the exhaust gas; means for supplying salt water to the condenser and conducting a portion of the condenser discharge salt water to the spraying means; and means supplied from the lower portion of said shells for discharging salt water including means for recirculating at least part of said salt water to the spraying means.

2. A plant as recited in claim 1 in which the means for supplying heat includes a first heat source, heat exchange means for supplying heat from the first heat source to the engine, and a combustion apparatus, the heat exchange means and combination apparatus being connected between the compressor and turbine.

References Cited

UNITED STATES PATENTS

| | | | |
|---|---|---|---|
| 1,379,502 | 5/1921 | Woern | 202—236 X |
| 2,372,846 | 4/1945 | Nettel et al. | 203—11 X |
| 2,756,029 | 7/1956 | Brogdon | 203—10 X |
| 2,637,684 | 5/1953 | Buffum | 203—10 X |
| 2,759,882 | 8/1956 | Worthen et al. | 203—11 |
| 3,192,130 | 6/1965 | Pottharst | 202—186 X |
| 3,243,359 | 3/1966 | Schmidt | 203—10 X |
| 3,248,304 | 4/1966 | Goeldner | 202—236 X |
| 3,351,537 | 11/1967 | Peterson | 202—236 X |
| 3,356,591 | 12/1967 | Peterson | 203—10 |

OTHER REFERENCES

Chemical Engineering (October 1956) pp. 128–130.

NORMAN YUDKOFF, *Primary Examiner.*

F. E. DRUMMOND, *Assistant Examiner.*

U.S. Cl. X.R.

60—50; 202—197, 236; 203—10, 49